United States Patent [19]
Bradley et al.

[11] 3,960,994
[45] June 1, 1976

[54] PREPARATION OF HIGH TEMPERATURE GAS-COOLED REACTOR FUEL ELEMENT

[75] Inventors: Ronnie A. Bradley, Oak Ridge; John D. Sease, Knoxville, both of Tenn.

[73] Assignee: The United States of America as represented by the United States Energy Research and Development Administration, Washington, D.C.

[22] Filed: Nov. 26, 1974

[21] Appl. No.: 527,470

[52] U.S. Cl. .............................. 264/.5; 252/301.1 R
[51] Int. Cl.² .......................................... G21C 21/00
[58] Field of Search ................ 264/.5; 252/301.1 R, 252/301.1 S

[56] References Cited
UNITED STATES PATENTS

| 3,042,594 | 7/1962 | Hauth | 264/.5 X |
| 3,558,750 | 1/1971 | Davis et al. | 264/.5 |
| 3,644,604 | 2/1972 | Hooker | 264/.5 |
| 3,712,809 | 1/1973 | Bumm et al. | 264/.5 X |
| 3,845,178 | 10/1974 | Hrovat et al. | 264/.5 |

Primary Examiner—Samuel W. Engle
Assistant Examiner—Peter A. Nelson
Attorney, Agent, or Firm—Dean E. Carlson; David S. Zachry; Louis M. Deckelmann

[57] ABSTRACT

This invention relates to a method for the preparation of high temperature gas-cooled reactor (HTGR) fuel elements wherein uncarbonized fuel rods are inserted in appropriate channels of an HTGR fuel element block and the entire block is inserted in an autoclave for in situ carbonization under high pressure. The method is particularly applicable to remote handling techniques.

2 Claims, No Drawings

PREPARATION OF HIGH TEMPERATURE GAS-COOLED REACTOR FUEL ELEMENT

BACKGROUND OF THE INVENTION

This invention was made in the course of, or under, a contract with the United States Atomic Energy Commission.

The manufacture of fuel rods for insertion in high temperature gas-cooled reactor (HTGR) fuel elements has been described in U.S. Pat. No. 3,763,292 and in the Report: ORNL-TM-4207, August 1973, pg. 13. Typically, these rods are about one half inch in diameter and two inches in length and about 3000 are used to load a single graphite fuel element block. The core of an 1160 HTGR will contain about 4000 fuel elements, of which about 1000 will be replaced annually. It is anticipated that about 40 percent of the fuel elements will be fabricated remotely from recycle fuel and this will amount to about 60 to 80 fuel elements per day in a moderately-sized commercial recycle fuel plant.

The current method of preparing HTGR fuel rods at the Oak Ridge National Laboratory involves placing the required carbon-coated particles in a mold, injecting a molten matrix (consisting of a mixture of graphite powder and pitch) throughout the interstices between particles, solidification of the matrix and subsequent carbonization of the matrix to convert the pitch to carbon. These rods are then available for insertion into holes in a graphite fuel element block. For the carbonization step, green fuel rods are packed in alumina powder, one to each compartment of an "egg crate" tray, and heated to 700°–1000°C for about ½ hour. After removal from the alumina, the $Al_2O_3$ is cleaned from the surfaces and the rods are placed in graphite trays for heat treatment at 1800°C for about ½ hour. Packing the rods in $Al_2O_3$ powder for carbonization is time consuming and not amenable to convenient remote fabrication. Therefore, experimental work has been carried out at Oak Ridge National Laboratory to develop a process for carbonizing the fuel rods directly in the graphite fuel element. Most of this work has been performed using graphite tubes to simulate a section of the graphite fuel element.

Fuel element fabrication processes have also been developed at Gulf General Atomic. Their processes involve similar steps; they have also experimented with in-block carbonization wherein green fuel rods are inserted in small sections of the fuel element block representing about one-sixth of a whole block and the unit then raised to carbonization temperature followed by a heat treatment. Their success, however, in such fabrication steps has been marginal.

A problem that arises with both the ORNL and GGA processes is the possible rupture of the carbon coating on fuel particles during heat treatment. If the bond between the matrix and the carbon coating is too great, shrinkage of the matrix during heat treatment produces stresses which tear or rupture the coating. Additional shrinkage of the matrix and the carbon coated particles during irradiation would aggravate the problem. This would result in the release of fission products to a reactor system during irradiation. Unfortunately, there is no method known to evaluate the quality of each fuel rod or the entire fuel element in the case of in-block carbonization.

The tendency for particle breakage due to matrix-particle interaction has been related to the amount of residual carbon resulting from carbonization of the matrix binder (pitch). This is sometimes referred to as the pitch coke yield. When carbonizing at atmospheric pressure, the tendency for particle breakage increases as the pitch coke yield increases (above some threshold value). The pitch coke yield of fuel rods carbonized in graphite tubes to simulate in-block carbonization is normally about twice that obtained when carbonizing in packed $Al_2O_3$, but depends on process variables such as the heating rate and the permeability of the graphite tubes.

High pitch coke yield, per se, is not undesirable. It is undesirable only if it leads to failure of the pyrolytic carbon coating due to matrix-particle interaction. If particle breakage can be avoided, high pitch coke yield could be desirable in that it would increase the matrix density, thereby increasing the thermal conductivity of the fuel rod. High pitch coke yield also increases the carbon-to-thorium ratio in the fuel rod which is also economically advantageous.

Thus, there exists a need for an improved method of carbonizing fuel rods within fuel element blocks such that any rupture of the carbon coating of individual particles within the rod is minimized. This need has been met in the present invention in a manner to be described hereinbelow.

SUMMARY OF THE INVENTION

It is the object of the present invention to provide an improved method of carbonizing fuel rods within fuel element blocks while at the same time minimizing any rupture of the carbon coating of individual particles within the rods when carbonization has been accomplished.

The above object has been accomplished in the present invention by inserting uncarbonized fuel rods in appropriate channels of an HTGR fuel element block and then inserting the entire block in an autoclave for in situ carbonization while the block is subjected to a desired high pressure.

DESCRIPTION OF THE PREFERRED EMBODIMENT

Briefly, the improved method of the present invention involves loading green fuel rods, fabricated from carbon-coated particles and carbonaceous matrix, into close fitting channels of a graphite fuel element block and thereafter subjecting the entire block to a pressure of 5,000 to 15,000 psi while increasing the temperature to about 700° to 1,000°C at a rate of about 100°C/hour. Each of the fuel rods, or sticks, consists of a dispersion of pyrolytic carbon coated nuclear fuel oxide or carbide microspheres within a carbon or graphite matrix, for example. The temperature and pressure are maintained for about 1 to 2 hours, after which the block is cooled under pressure. Thereafter, as is normal practice, the fuel block is heat treated in an inert atmosphere to about 1800°C.

Carbonizing under the conditions of an autoclave provided the essential feature of maintaining a compressive stress on the fuel particles until the matrix strength is reduced. Accordingly, this substantially reduces tensile stresses that would otherwise occur in particle coatings. This compressive force is uniformly applied so that differential stress effects caused by uneven heating rates in a big block are ameliorated. Furthermore, the autoclaving carbonization is less sensitive to variations in the permeability of the graphite fuel elements and will permit the use of a wide range of fillers and binders.

The present method has been demonstrated using the following test conditions. Four fuel rods each were loaded into four graphite tubes whose wall thickness approximated the web dimension between holes of an HTGR fuel element. Graphite plugs were inserted into both ends of each tube so as to provide axial restraint of the fuel rods. The loaded tubes were placed in an open container and inserted into an autoclave, after which the pressure was raised to 10,000 psi (at room temperature) using argon.

After the desired pressure was reached, the autoclave was heated at about 100°C/hour to a temperature of 700°C, venting the gas to maintain a pressure of 10,000 psi. This temperature and pressure were maintained for about 2 hours to assure equilibrium temperature in the tubes and to allow carbonization of the matrix pitch to reach completion. The autoclave was cooled to room temperature, under pressure, and then the pressure was removed and the container removed. The container was then placed in a furnace where the tubes were heated in an argon atmosphere to 1800°C.

The carbonized and heat-treated fuel rods were then removed from the graphite tubes for inspection. Of particular interest was an observance for broken particles and matrix-particle interactions. When compared to fuel rods prepared by prior art methods, those prepared by the present method exhibited fewer broken particles. Detailed examination determined that the matrix apparently shrank without damage to the particle coating. The pitch coke yield of the rods (60 wt. %) was about three times that normally obtained in rods carbonized in packed $Al_2O_3$ powder and about one and one-half to two times that obtained when carbonizing in graphite tubes at atmospheric pressure. This higher pitch coke yield should provide the advantages described above with respect to thermal conductivity and carbon-to-thorium ratio.

Thus, it can be seen that the improved method described hereinabove, provides the advantage of a reduction in the degree of internal stress developed in the body of the fuel stick which leads to reduced incidence of rupture of the pyrolytic-carbon coatings on each fuel microsphere.

This invention has been described by way of illustration rather than by limitation and it should be apparent that it is equally applicable in fields other than those described.

What is claimed is:

1. An improved method for making nuclear fuel composites comprising the steps of loading a plurality of respective graphite tubes with a plurality of respective green compacts consisting of a dispersion of a nuclear fuel oxide or carbide microspheres coated with pyrolytic carbon within a pitch matrix, inserting graphite plugs into both ends of each respective graphite tube after said loading step, placing said tubes in an open container, inserting said container into an autoclave, after which the pressure within said autoclave is raised to a selected pressure in the range 5,000–15,000 psi at room temperature using argon gas, heating said autoclave after the selected pressure has been reached at about 100°C/hour to a temperature of 700°C while at the same time venting said gas to maintain said selected pressure, maintaining said 700°C temperature and said selected pressure for about 2 hours to assure equilibrium temperature in the tubes and to allow carbonization of the matrix pitch to reach completion, then cooling said autoclave under pressure to room temperature, removing said pressure and then removing said container from said autoclave, placing said container in a furnace where the tubes in said container are heated in an argon atmosphere to 1800°C, and finally, after cooling, removing the heat-treated fuel compacts from the graphite tubes.

2. The method set forth in claim 1, wherein said selected pressure is 10,000 psi.

* * * * *